(12) United States Patent
Talon et al.

(10) Patent No.: US 10,822,160 B2
(45) Date of Patent: Nov. 3, 2020

(54) CAPSULE FOR BEVERAGE PREPARATION

(71) Applicant: NESTEC S.A., Vevey (CH)

(72) Inventors: Christian Talon, Vufflens-le-Chateau (CH); Samuel Odet, Vevey (CH); Jean-Luc Denisart, Cully (CH); Vincent Rognon, Orbe (CH)

(73) Assignee: Societe des Produits Nestle S.A., Vevey (CH)

( * ) Notice: Subject to any disclaimer, the term of this patent is extended or adjusted under 35 U.S.C. 154(b) by 432 days.

(21) Appl. No.: 15/876,411

(22) Filed: Jan. 22, 2018

(65) Prior Publication Data
US 2018/0141747 A1    May 24, 2018

Related U.S. Application Data

(62) Division of application No. 14/904,186, filed as application No. PCT/EP2014/064866 on Jul. 10, 2014, now Pat. No. 9,902,556.

(30) Foreign Application Priority Data

Jul. 10, 2013  (EP) .................................... 13175955

(51) Int. Cl.
*A47J 31/40*  (2006.01)
*B65D 85/804*  (2006.01)
*A47J 31/44*  (2006.01)

(52) U.S. Cl.
CPC ........ *B65D 85/8043* (2013.01); *A47J 31/407* (2013.01); *A47J 31/4403* (2013.01)

(58) Field of Classification Search
CPC . B65D 85/8043; A47J 31/407; A47J 31/3695; A47J 31/368; A47J 31/3623;
(Continued)

(56) References Cited

U.S. PATENT DOCUMENTS 3,127,073 A * 3/1964 Carleton .............. B67D 7/0266
222/400.7
3,971,305 A * 7/1976 Daswick ................. A47J 31/02
99/295
(Continued)

FOREIGN PATENT DOCUMENTS

CH        605293 A5     9/1978
CN     201987311 U      9/2011
(Continued)

*Primary Examiner* — Jimmy Chou
(74) *Attorney, Agent, or Firm* — K&L Gates LLP

(57) ABSTRACT

A container for food or beverage preparation has walls defining at least one compartment adapted for containing at least one precursor ingredient, the walls including at least one fluid connection portion for fluidly coupling to a cooperating fluid connection portion of a food or beverage preparation machine having at least one source of a fluid mixing ingredient, whereby a food or beverage product is prepared within the compartment by mixing the mixing ingredient with the precursor ingredient. The container further includes at least one food or beverage delivery wall, and the container includes built-in pump means suitable for pumping the mixing ingredient from the source when the container is fluidly connected to the machine and for generating a fluid circulation within the at least one compartment, such that a food or beverage product is prepared and expelled through the delivery wall.

3 Claims, 10 Drawing Sheets

(58) Field of Classification Search
CPC ...... A47J 31/42; A47J 31/605; A47J 31/3614;
A47J 31/3619; A47J 31/0663; A47J
31/32; A47J 31/0573; A47J 31/057; A47J
31/4403
USPC .......... 99/286, 289 R, 295, 302 R, 307, 323;
426/77, 79, 80, 115
See application file for complete search history.

(56) References Cited

U.S. PATENT DOCUMENTS

| | | | | |
|---|---|---|---|---|
| 4,627,986 | A * | 12/1986 | Bardsley | B65D 81/32 206/217 |
| 4,846,052 | A | 7/1989 | Favre et al. | |
| 5,104,666 | A * | 4/1992 | Sanvitale | A47J 31/30 426/109 |
| 5,472,719 | A * | 12/1995 | Favre | A47J 31/0673 426/112 |
| 7,703,381 | B2 * | 4/2010 | Liverani | A47J 31/3695 99/295 |
| 7,981,451 | B2 * | 7/2011 | Ozanne | B65D 85/8043 426/79 |
| 8,147,887 | B2 * | 4/2012 | Dogan | B65D 85/8043 426/77 |
| 8,220,382 | B2 * | 7/2012 | Verbeek | B65D 85/8043 99/295 |
| 8,230,775 | B2 * | 7/2012 | Vanni | B65D 85/8043 99/295 |
| 8,322,271 | B2 * | 12/2012 | Glucksman | B65D 85/8043 99/287 |
| 8,501,254 | B2 * | 8/2013 | Wong | B65D 65/466 426/77 |
| 8,563,058 | B2 * | 10/2013 | Roulin | A47J 31/407 426/115 |
| 8,656,827 | B2 * | 2/2014 | Vanni | B65D 85/8043 99/295 |
| 9,066,622 | B2 | 6/2015 | Denisart et al. | |
| 9,387,978 | B2 | 7/2016 | Deuber | |
| 9,434,532 | B2 * | 9/2016 | Yoakim | A47J 31/22 |
| 2004/0005384 | A1 * | 1/2004 | Cai | A47J 31/0647 426/77 |
| 2005/0266122 | A1 * | 12/2005 | Franceschi | B65D 85/8043 426/77 |
| 2006/0110507 | A1 * | 5/2006 | Yoakim | A47J 31/3628 426/433 |
| 2006/0280841 | A1 * | 12/2006 | Cai | B65D 85/8043 426/77 |
| 2007/0186784 | A1 * | 8/2007 | Liverani | B65D 85/8043 99/295 |
| 2009/0155422 | A1 * | 6/2009 | Ozanne | A47J 31/3628 426/89 |
| 2010/0203198 | A1 * | 8/2010 | Yoakim | A23F 5/262 426/80 |
| 2010/0247714 | A1 * | 9/2010 | Massey | A23L 2/385 426/78 |
| 2011/0217421 | A1 * | 9/2011 | Perentes | A47J 31/0673 426/80 |
| 2011/0315021 | A1 * | 12/2011 | Eichler | B65D 85/8046 99/295 |
| 2012/0009304 | A1 * | 1/2012 | Perentes | A47J 31/22 426/110 |
| 2012/0015080 | A1 * | 1/2012 | Roulin | B65D 85/8043 426/110 |
| 2012/0258210 | A1 * | 10/2012 | Wong | A47J 31/3676 426/115 |
| 2013/0087051 | A1 * | 4/2013 | Frydman | B65D 85/8043 99/295 |
| 2013/0095212 | A1 * | 4/2013 | Beer | B65D 65/466 426/80 |
| 2013/0115340 | A1 * | 5/2013 | Doleac | B65D 85/8043 426/115 |
| 2013/0122157 | A1 * | 5/2013 | Dogan | B65D 85/8043 426/115 |
| 2013/0125762 | A1 * | 5/2013 | Dogan | B65D 85/8043 99/295 |
| 2013/0156899 | A1 * | 6/2013 | Quinn | A23F 3/18 426/115 |
| 2013/0216663 | A1 * | 8/2013 | Dogan | B65D 85/8043 426/115 |
| 2013/0243911 | A1 * | 9/2013 | Abegglen | B65D 85/8043 426/115 |
| 2013/0323366 | A1 * | 12/2013 | Gerbaulet | A47J 31/22 426/77 |
| 2014/0170271 | A1 * | 6/2014 | Zweed | B65D 85/8043 426/115 |
| 2014/0287105 | A1 * | 9/2014 | Husband | B65D 65/466 426/115 |
| 2014/0373725 | A1 * | 12/2014 | Mastropasqua | B65D 1/0261 99/295 |
| 2014/0377414 | A1 * | 12/2014 | Walters | B65D 85/8043 426/115 |
| 2015/0068405 | A1 * | 3/2015 | Bartoli | A47J 31/407 99/295 |
| 2015/0125576 | A1 * | 5/2015 | Dogan | B65D 85/8043 426/115 |
| 2015/0329282 | A1 * | 11/2015 | Bartoli | B01F 15/0254 426/115 |
| 2015/0344219 | A1 * | 12/2015 | Bartoli | B65D 85/8043 426/115 |

FOREIGN PATENT DOCUMENTS

| | | | | |
|---|---|---|---|---|
| CN | 102958816 | | 3/2013 | |
| DE | 19732100 | A1 | 1/1999 | |
| EP | 0242556 | | 10/1987 | |
| EP | 1 472 156 | | 11/2004 | |
| EP | 1784344 | | 5/2007 | |
| EP | 1 967 100 | | 9/2008 | |
| EP | 2162653 | | 3/2010 | |
| EP | 2236437 | | 10/2010 | |
| EP | 2236437 | A1 * | 10/2010 | ............ A47J 31/407 |
| EP | 2559636 | | 2/2013 | |
| JP | S63176952 | A | 7/1988 | |
| RU | 2403198 | C2 | 11/2010 | |
| WO | 2011117768 | | 9/2011 | |
| WO | 2012104760 | | 8/2012 | |
| WO | 2012174331 | A1 | 12/2012 | |
| WO | 2013012971 | A2 | 1/2013 | |
| WO | WO-2013156932 | A1 * | 10/2013 | ............ A47J 31/407 |

* cited by examiner

CAPSULE FOR BEVERAGE PREPARATION

PRIORITY CLAIM

The present application is a Divisional of U.S. patent application Ser. No. 14/904,186 filed Jan. 11, 2016, which is a National Stage of International Application No. PCT/EP2014/064866 filed Jul. 10, 2014, which claims priority to European Patent Application No. 13175955.7 filed Jul. 10, 2013, the entire contents of which are incorporated herein by reference.

FIELD OF THE INVENTION

The present invention concerns a container for food or beverage preparation, said container being designed for connection to a non-pressurized ingredient source, such as a water source, to be mixed under pressure with the container contents for preparing said food or beverage.

BACKGROUND OF THE INVENTION

In the field of food or beverage preparation, it is known to use single-serve capsules for mixing a precursor ingredient contained in said capsule, with a mixing ingredient fed from a pressurized source contained in a food or beverage preparation machine.

Generally, food or beverage preparation machines are well known in the food science and consumer goods area. Such machines allow a consumer to prepare at home a given type of food or beverage, for instance a coffee-based beverage, e.g. an espresso or a brew-like coffee cup, or other types of beverages like chocolate, teas, soups and the like.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules.

The machine comprises a receptacle or cavity for accommodating said capsule and a fluid injection system for injecting a fluid, preferably water, under pressure into the capsule. Water injected under pressure in the capsule, for the preparation of a coffee beverage according to the present invention, is preferably hot, that is to say at a temperature above 70° C. However, in some particular instances, it might also be at ambient temperature, or even chilled. The pressure (relative to atmospheric pressure) inside the container/capsule chamber during extraction and/or dissolution of the capsule contents, until the capsule opens, increases up to typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known, and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule.

Capsules allowing the application of this principle have already been described for example in applicant's European patents no° EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in applicant's European patent EP 2162653 B1.

When the beverage to be prepared is coffee, one interesting way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for a food preparation, as described above. A capsule holder was described for example in applicant's European patent EP 1967100 B1.

Capsules have been developed for such an application of food preparation, and in particular for beverage preparation, which are described and claimed in applicant's European patent EP 1784344 B1, or in European patent application EP 2062831.

In short, such capsules comprise typically:
a hollow body and an injection wall which is impermeable to liquids and to air and which is attached to the body and adapted to be punctured by e.g. an injection needle of the machine,
a chamber containing a bed of roast and ground coffee to be extracted, or a soluble ingredient or mix of soluble ingredients,
an aluminium membrane disposed at the bottom end of the capsule, closing the capsule, for retaining the internal pressure in the chamber.

The aluminium membrane is designed for being pierced with piercing means that are either integral with the capsule, or located outside of said capsule, for example within a capsule holder of the machine.

The piercing means are adapted for piercing dispensing holes in the aluminium membrane when the internal pressure inside the chamber reaches a certain pre-determined value.

Also, optionally, the capsule can further comprise means configured to break the jet of fluid so as to reduce the speed of the jet of fluid injected into the capsule and distribute the fluid across the bed of substance at a reduced speed.

In many food and beverage preparation systems, several types of containers (such as capsules) can be used with the same machine. Some capsules can be used for infusion of a stationery precursor ingredient (e.g. roast and ground coffee) through which the mixing ingredient (e.g. hot water) flows. Some other capsules may also contain a soluble precursor ingredient, such as a soluble milk or chocolate powder, which is dissolved by mixing with a mixing ingredient like hot water.

In known food and beverage systems, the food or beverage preparation is equipped with a pump that withdraws the mixing fluid (typically water) from the machine reservoir and displaces it through the fluid pipe system of the machine towards the capsule wherein said water is injected.

EP 2236437 A1 is a European patent publication that discloses a capsule for use in a beverage production device, the capsule containing ingredients to produce a nutritional or food liquid when a liquid is fed into the capsule at an inlet face thereof, the capsule being provided with a filter having a plurality of filtering orifices, wherein it comprises a flow collection member placed downstream of the filter to collect the filtered liquid from the filtering orifices. The collection member comprises at least one restriction orifice to focus the flow of liquid in at least one jet of liquid at high velocity in the compartment containing the ingredients. The invention is particularly advantageous for producing a nutritional liquid (e.g., infant formula) or a food from powdered ingredients, when used with a machine able to inject water therein, by means of a pump placed within said machine.

WO 2012/104760 is a PCT application that discloses a capsule comprising a deformable and/or compressible casing, provided with a base wall and with a side wall defining a cavity that is open and suitable for containing an initial product to obtain a final food product, a supporting element fixed to a first edge of said casing and facing said cavity; the capsule further comprises a nozzle that is fixed to the supporting element and arranged for delivering into the cavity a fluid interacting with the initial product to make the final product, and for opening the base wall and enabling the final product to exit when the casing is compressed and crushed. The capsule is intended for use with a machine able to inject a fluid such as water therein by means of a fluid pump placed within said machine.

US 2010 0203198 is a US application disclosing a single-use capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation. The water injected within said capsule is introduced by a beverage machine to which said capsule is connected, said machine comprising a water pump.

WO 2011 117768 A capsule for making a drink comprises a cup-shaped main body forming a housing chamber containing a powdered or liquid substance. The capsule is meant to be connected to a beverage machine that has a pump for injecting water into the capsule for forming a beverage.

For the sake of clarity, a "pump" is defined within the meaning of the present invention as "a device that converts mechanical energy into fluid energy by any various technologies, typically by suction or compression, in order to move water, air, or other fluids into, through, or out of a system". Typically in the known food or beverage preparation systems, the pump contained in the machine is actuated by an electric motor, and converts mechanical energy brought by said electric motor, into fluid energy that circulates water from the machine reservoir to the capsule, as described above. The pumps used in food or beverage preparation machines are typically piston pumps using solenoid technology.

The fact that water passes through the pump of the machine leads to scaling of the internal elements of the pump. In case the user does not properly descale the machine, the pump can stop working and the user needs to call for technical assistance or change the machine. Furthermore, pumps used in the known food or beverage preparation systems today are noisy as they are subject to vibrations throughout the pipe system of the machine. And most of them are expensive too.

It is therefore an objective of the present invention to provide a food or beverage system that obviates the drawbacks mentioned above.

SUMMARY OF THE INVENTION

The objective set out above is met with a container for food or beverage preparation, comprising walls defining at least one compartment adapted for containing at least one precursor ingredient, said walls comprising at least one fluid connection portion for fluidly coupling to a cooperating fluid connection portion of a food or beverage preparation machine having at least one source of a fluid mixing ingredient, whereby a food or beverage product is prepared within said compartment by mixing said mixing ingredient with said precursor ingredient, said container further comprising at least one food or beverage delivery wall.

According to the invention, said container is characterized in that it comprises built-in pump means suitable for pumping said mixing ingredient from said source when said container is fluidly connected to said machine, and for generating a fluid circulation within said at least one compartment, such that a food or beverage product is prepared and expelled through said delivery wall.

In a highly preferred embodiment of the invention, the pump means is a closed volume of the container—preferably but not exclusively inside the container—which comprises:
  (i) the container upper injection wall, which is capable of being alternatively outwardly, then inwardly, elastically stretched or deformed by an outside thrust actuator of the machine, without tearing or breaking,
  (ii) an admission opening that provides a fluid connection between the machine (1) and said closed volume, more precisely, from the source of water towards the interior of the container closed volume, and
  (iii) an exit opening that allows a fluid connection from the interior towards the outside of the closed volume.

The pump means integrated to the container is therefore advantageously made of a closed but deformable volume of said container, that is able to alternatively expend and retract when actuated, so that it will withdraw fluid from the machine fluid source, and circulate the volume of withdrawn fluid through the container internal vicinity.

Importantly, the volume and deformability properties of the container pump means—i.e. deformable closed volume—are such that the relative volume variation of the container during each stage—expanded, then collapsed—of the pumping cycles, is comprised between 5% and 200%, preferably between 10% and 90%, more preferably between 15% and 60% of the container initial volume at rest.

In a highly preferred embodiment of the invention, the admission opening consists of an inlet check valve, and/or said exit opening consists of a outlet check valve. In this way, the container not only comprises the pump chamber and its admission and exit openings, but also it contains the means to ensure that the flow of fluid is directed from the fluid source towards the ingredient contained within said container. However, as it can be understood, the check valves can be part of the machine to which the capsule is fluidly connected.

Preferably, the check valves are selected from the list of: duckbill valves, ball valves, umbrella valves, peristaltic valves, or a combination thereof. Any other kind of valves can be used for the purpose of the present invention, as long as they are one-way, non-return valves, or if they can be used as one-way-valves.

Advantageously, said stretchable or deformable wall comprises mechanical connection means suitable to be mechanically connected to connected to corresponding mechanical connection means of the pump actuator of the machine. In one embodiment, the mechanical connection means of the container is a rigid catching circular protrusion, and the corresponding mechanical connection means of the machine actuator is a connection groove wherein said protrusion can slide, or which it can otherwise catch.

Importantly, the pump integrated in the container according to the present invention can be actuated manually, but of course, it is preferably actuated automatically, by connecting the container to an actuator which is present in the machine.

In other terms, when the food and beverage container—for instance a coffee capsule—is functionally inserted into the food and beverage machine, two types of connections are performed. The first connection is a fluid connection which links the container to the fluid pipe system of the machine in such a way that fluid can circulate from the fluid source of the machine—for instance a water reservoir—towards and through the container compartment, wherein said fluid mixes as a mixing ingredient with the food or beverage precursor ingredient—for instance a coffee powder—which is contained into the container compartment.

The second type of connection that is performed between the container and the machine is a mechanical connection, which mechanically links the container to the pump actuator of the machine. The mechanical connection serves to actuate the pump means that are built-in with the container, such that fluid can be withdrawn from the fluid system of the machine, and be conducted through the container compartment as described above.

Also preferably, said fluid connection portion is adjacent to, or integrated with said mechanical connection means. An exemplary configuration of said connections in a container according of the invention will be described in greater details in the embodiment description hereafter.

In a highly preferred embodiment of the present invention, the container is a rigid or semi-rigid food or beverage capsule. Typically, it is a single-use capsule for preparing beverages such as coffee, tea, chocolate, dairy-based products, or a combination thereof, or also soups or nutritional products such as, but not limited to, infant formula products or nutritional products for elderly persons. It can also be used for preparing other types of edible food, for instance non liquid food like ice cream, dessert jellies, gel bouillons, crouton soups, or potages. The product preparation pressure within such rigid or semi-rigid capsules can be substantially equivalent to the atmospheric pressure, for performing infusion-like preparations. Said product preparation pressure inside the container compartment can also be above atmospheric pressure, for performing extraction or dissolution of the precursor ingredient. In this case, said preparation pressure can be typically within the range of 1 to 20 bar, preferably between 2 and 15 bar (relative pressure). The exact preparation pressure will depend on the type of product that is prepared. For instance, if the product is an espresso coffee made from roast and ground coffee precursor ingredient, then the pressure will preferably be within the range of 5 to 19 bar, more preferably between 8 and 15 bar.

Alternatively, the container according to the invention can be a soft pod, or a sachet, that can be used for instance for infusions of herbs of tea leaves at a pressure inside the container compartment that is substantially equivalent to atmospheric pressure. It can also be used e.g. to prepare syrup beverages from liquid concentrates as precursor ingredient.

The present invention is also directed to a food or beverage preparation system comprising:
(i) a container as described above, and
(ii) a food or beverage preparation machine having a mixing fluid reservoir, a fluid pipe system, optionally a fluid heating and/or chilling device, means—preferably a movable connection rod—for connecting the fluid connection portion of the container to the outlet of the machine pipe system, and further comprising a mechanical actuator and mechanical connection means for connecting mechanically said actuator to the elastically stretchable or deformable wall of the container.

Preferably, said fluid connection portion is adjacent to, or integrated with said mechanical connection means.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
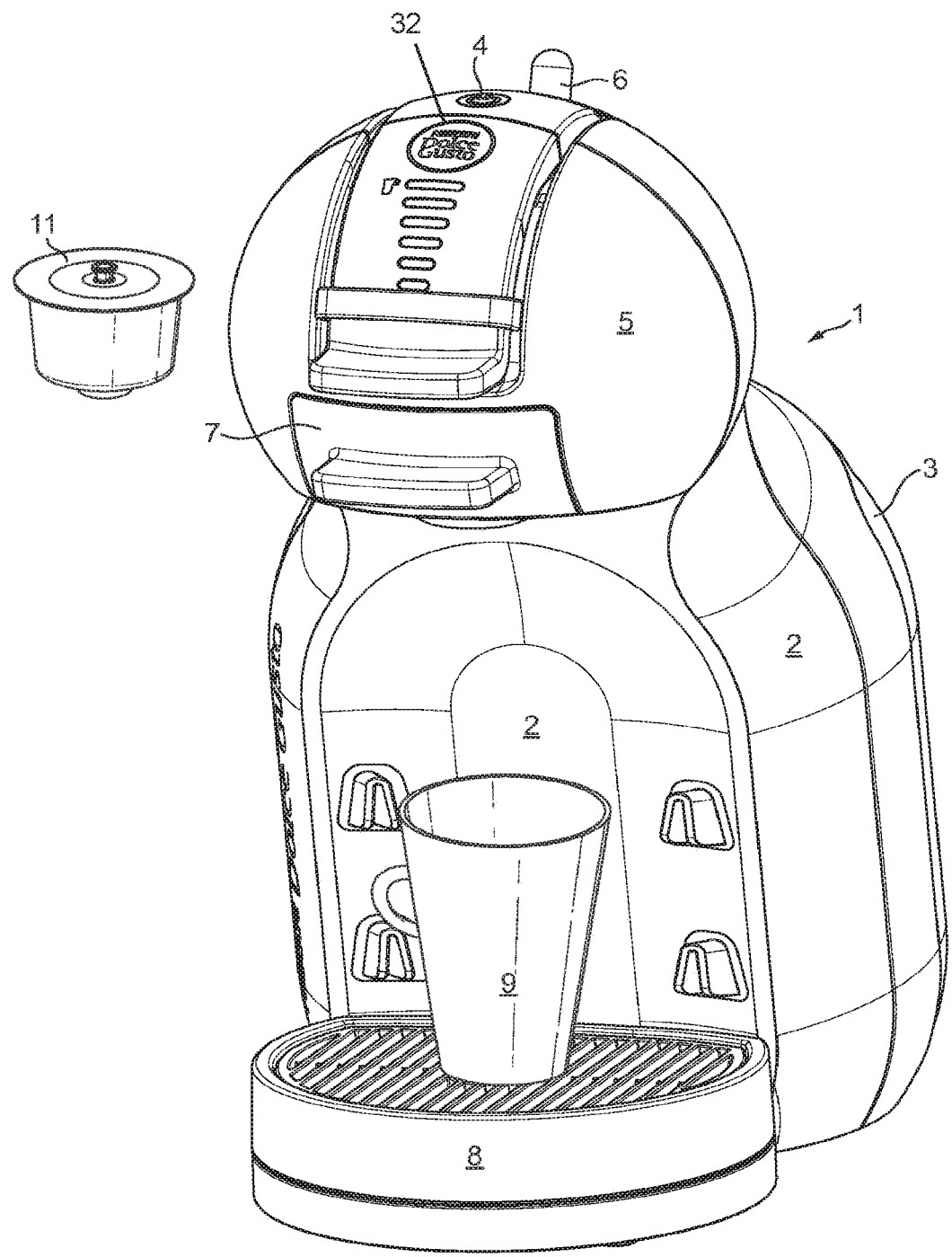
FIG. 1 is a perspective view of a food or beverage container and machine.

In the following description, it will be considered that the source of mixing ingredient is a water source. Such a limitation should not be taken as a limitation of the invention scope. The container described and claimed therein can be used with other sources of mixing ingredient.

Also, in the rest of the present description, and for simplification purposes, it will be considered that the container of the invention is a beverage container, and more precisely a single-serve beverage capsule. Again, this should not be taken as a strict limitation of the scope of the invention. The container of the invention can be of another type than a capsule, for instance it can be a soft pad, a pod, a sachet, a rigid or semi-rigid cartridge, or a combination thereof.

The container of the invention can be made of any type of impermeable material like plastic, coated paper, coated cardboard, metal or alloy, glass, synthetic or natural rubber or elastomer, or a combination thereof. Preferably, materials will be chosen from cost-effective and ecologic material, having barrier properties, preferably at least against moisture and oxygen.

The precursor ingredient contained in the container of the invention can be of any type for preparing a food or a beverage product. In the following a beverage container will be described in more detail. However, the principle of the invention can be applied to any container for preparation of an edible preparation, be it a beverage or a semi-solid or solid food, such as for example but not limited to: ice cream, potage, smoothies, cooking dough, soup comprising solid elements such as croutons, or even fully solid food such as pastry.

Two embodiments of a container according to the present invention will now be described in detail, with reference to the drawing. In these two embodiments, it is considered that the container is a beverage capsule for use in a beverage preparation machine. The capsule contains a precursor ingredient, typically roast and ground coffee powder. The machine and the capsule form a beverage preparation system, as illustrated in FIG. 1.

As shown in FIG. 1, the machine 1 comprises a machine body 2, a reservoir 3 adapted for containing a mixing ingredient, for instance water. The reservoir is removable from the machine body 2 for refill. The machine body 2 comprises an on/off push button 4. The machine 1 further comprises an extraction head 5. The head 5 comprises a water temperature selector for hot or cold water taking the form of two buttons 6 (one for selecting a hot beverage, the other for cold), and a removable capsule holder 7. The machine 1 further comprises a cup tray 8, for holding a cup 9 under the extraction head. The machine further comprises a control panel 32 comprising a selector wheel for selecting for instance the volume of beverage to be dispensed, as well as a screen, wherein data about the beverage preparation settings are represented. The capsule holder 7 is adapted to receive a capsule 11.

The machine 1 comprises a fluid pipe system that conveys the water held in the reservoir 3 towards the extraction head 5 where it is injected inside the capsule 11. Optionally, the mixing fluid can be conveyed through a heating or chilling element of the machine, that is located between the reservoir 3 and the extraction head 5. The water is delivered to the capsule by the machine 1 as a non-pressurized source.

Generally in the context of the present invention, by "non-pressurized" source of mixing ingredient (e.g. water) it is meant that the source does not comprise an element able to generates a pressure to force the flow of mixing ingredient towards the capsule. The relative pressure of mixing ingredient within the fluid system of the machine is about equal to atmospheric pressure. However, the mixing ingredient is preferably at a relative pressure inside the capsule, which is comprised between 1 and 20, more preferably 2 to 15 bar.

Figure 2:
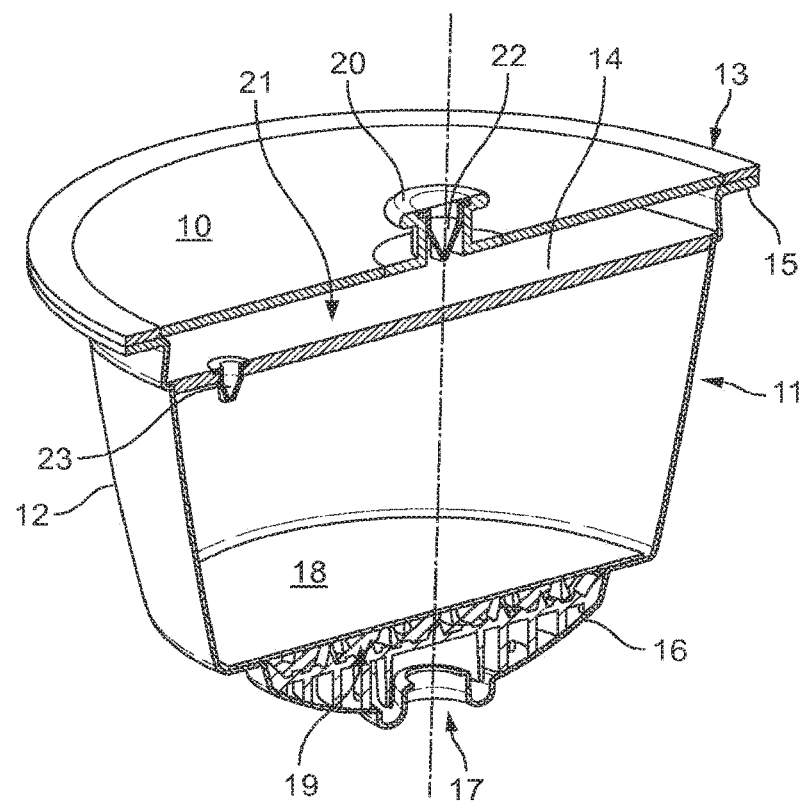
FIG. 2 is a perspective cut view of a first embodiment of a container according to the invention.

A first embodiment of a beverage capsule 11 is illustrated in FIG. 2. The capsule 11 comprises a capsule body made of capsule walls 12, which are made of a rigid or semi-rigid thermoplastic such as a polypropylene or polyethylene. The capsule body walls 12 have a generally cylindrical or frustoconical shape. The material can also be made from a biodegradable material such as a material containing cellulosic fibres, or starch for instance. The manufacturing process can be thermoforming or injection. It can also involve in-mould labelling, for instance in order to provide the capsule with specific barrier properties by using a film label with moisture and oxygen barrier properties. Such an in-mould labelling process for making a capsule is generally described in the applicant's European patent publication EP 2559636 A1.

The moisture and oxygen barrier properties of the container walls can be achieved with any kind of suitable material such as barrier thermoplastic films having single or multiple layers, or aluminium, or paper, or a combination thereof.

The capsule body walls 12 comprise upper and lower openings. The upper opening of the capsule body is closed by an upper injection wall 13. The capsule 11 further comprises a rigid distributor wall 14 that is located between said injection wall 13 and the capsule interior compartment. The upper injection wall 13 is welded on upper peripheral edges 15 of the capsule body walls 12 as illustrated in FIG. 2.

The capsule 11 shown in FIG. 2, further comprises a bottom wall 16 having a dispensing opening 17. It further comprises a pierceable membrane 18, preferably made of aluminium, which is sealed between the lateral capsule walls 12 and the bottom walls 16. Between the pierceable membrane 18 and the bottom wall 16, is a piercing plate 19 which serves to open the pierceable membrane by piercing or tearing when fluid pressure inside the capsule compartment increases, so as to let the product formed inside said compartment out towards a consumer's cup 9.

Figure 3:
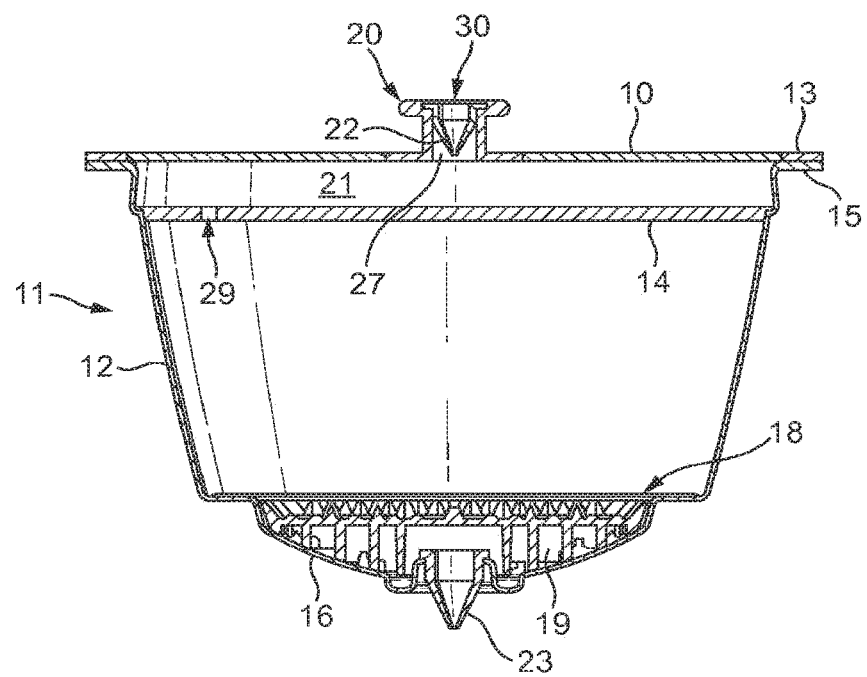
FIG. 3 is a perspective cut view of a second embodiment of a container according to the invention.
Figure 5:
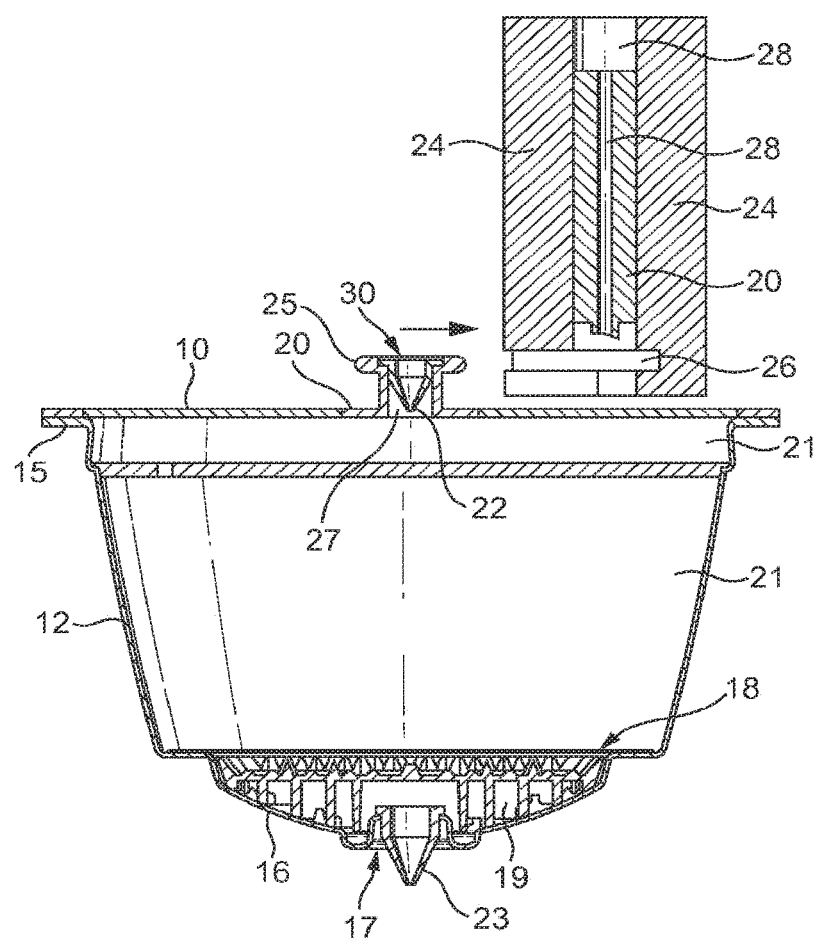
FIG. 5 is a side view similar to FIG. 4.

As shown in FIGS. 2, 3 and 5, the capsule upper injection wall 13 20 further comprises a fluid connection portion 20, for fluidly coupling the capsule 11 to a cooperating fluid connection portion 21 of the food or beverage preparation machine 1.

According to the invention, the capsule 11 also further comprises built-in pump means suitable for pumping water from the machine 1, when said capsule 11 is fluidly connected to said machine, and for generating a fluid circulation within the compartment, such that a food or beverage product is prepared and expelled through the capsule delivery wall (i.e. the bottom wall 16 and its dispensing opening 17).

The pump means is a closed volume 21 inside the capsule which comprises:
    (i) a portion 10 of the capsule upper injection wall 13, which is capable of being alternatively outwardly, then inwardly, elastically stretched by an outside thrust actuator of the machine, without tearing or breaking,
    (ii) an inlet check valve 22 that provides a fluid connection between the machine 1 and said closed volume, more precisely, from the source of water towards the interior of the capsule closed volume,
    (iii) an outlet check valve 23 that allows a fluid connection from the interior towards the outside of the closed volume 21.

As illustrated in FIG. 2, the check valves are duckbill one-way-valves.

In the first embodiment of the invention illustrated in FIG. 2, the closed volume 21 is formed between the inlet check valve 21 attached to the upper injection wall 13, and the outlet check valve 23 that is attached to the rigid distributor wall 14 and separates said closed volume 21 from the rest of the capsule compartment that encloses the precursor ingredient (e.g. coffee powder).

In the second embodiment of the invention illustrated in FIG. 3, the outlet check valve 23 is located at the bottom of the capsule and closes the dispensing opening 17 of the capsule. Consequently, the rigid distributor wall 14 does not separate the capsule interior compartment as it comprises at least one through hole 29. This way, the whole capsule interior compartment plays the role of a closed volume 21 forming the pump chamber of the capsule. Preferably, the precursor ingredient contained in the capsule is located in the portion of the capsule compartment which is between the rigid distributor wall 14 and the bottom wall 16 of the capsule. However, it is also possible to enclose the same ingredient throughout the whole volume of the capsule compartment, or alternatively, two different ingredients can be separated from one another by the rigid distributor wall 14.

The number of holes 29 and their diameter will be appropriately chosen depending on the type of ingredient and on the corresponding type of product preparation. In case of only one hole as illustrated in FIG. 3, the flow of fluid through said hole will create a single jet, with a powerful mixing effect. This configuration is preferably chosen in case the ingredient contained in the capsule is a soluble powder, which requires a powerful swirling movement together with the water injected therein, so as to improve the dissolution of said powder with said water. Alternatively, in case the ingredient contained in the capsule compartment is a roast and ground coffee, the rigid wall 14 comprises a plurality of holes 19, distributed evenly across its surface, so as to ensure a proper wetting of the coffee bed contained between said wall 14 and the bottom wall 16 of the capsule.

In all cases, the diameter of the holes 29 is much preferably inferior to the smallest particles of the precursor ingredient, but it is sufficient to ensure a proper flow of water through the rigid distributor wall 14. The diameter can be comprised typically between 10 microns and 3 mm, preferably between 100 microns and 1 mm.

The upper injection stretchable wall 13 is made of any suitable material having elastically deformable properties, like natural or synthetic elastomers such as silicon-based elastomers, rubber, or alternatively simply plastic materials suitable for making a fine rigid capsule wall by injection, extrusion or thermoforming, as well as plastic film for the deformable portion of the capsule.

Figure 4:
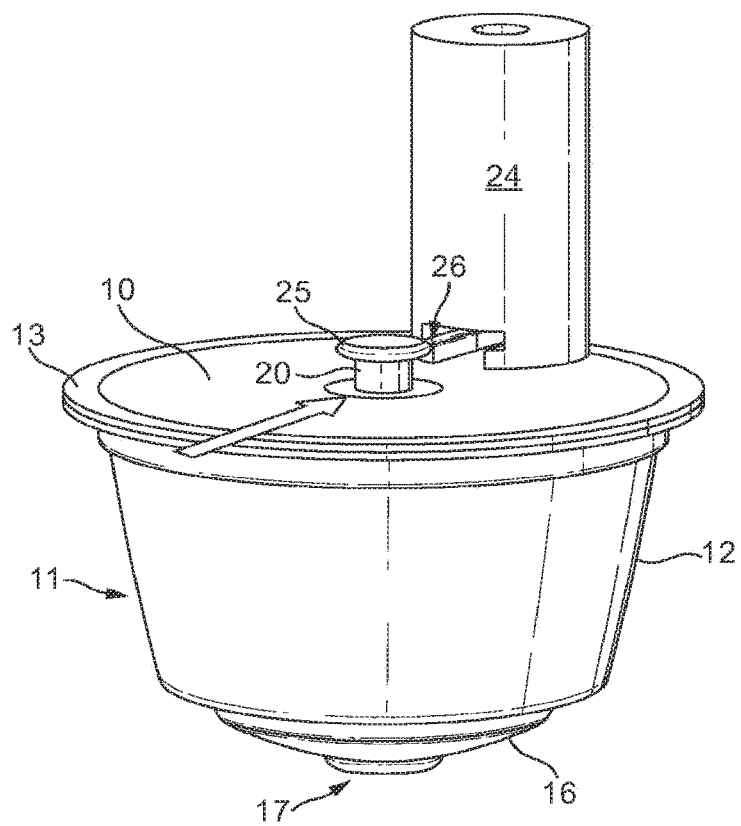
FIG. 4 is a schematic perspective view showing the connection of a container to the fluid source and actuator of a food or beverage machine.
Figure 6:
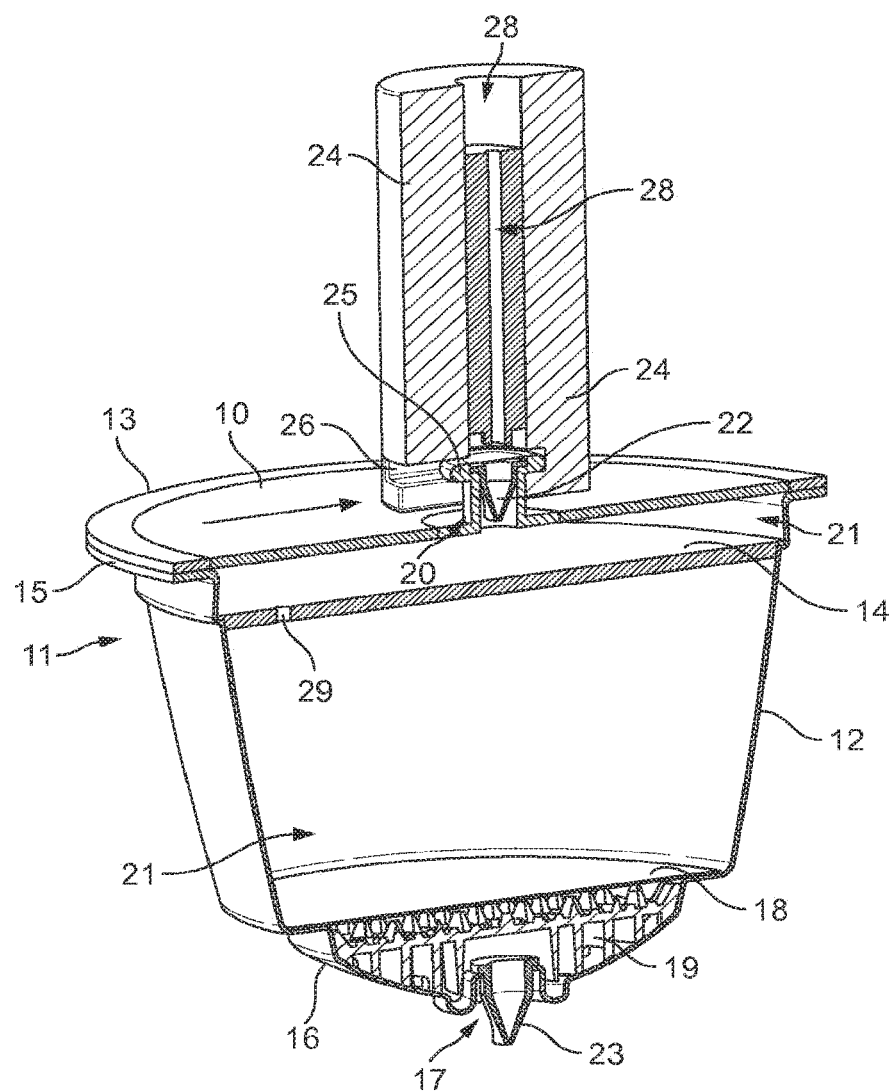
FIG. 6 is a perspective cut view showing a container according to the invention, connected to the actuator of a food or beverage machine.

As shown in FIG. 2, the stretchable injection wall 13 comprises mechanical connection means suitable to be mechanically connected to a pump actuator 24 of the machine by an horizontal sliding movement of the capsule relative to the actuator 24, as illustrated with arrows in FIGS. 4, 5 and 6. More precisely, the mechanical connection means comprises a rigid catching circular protrusion 25 able to slide into a cooperating connection groove 26 of the pump actuator 24.

Importantly, the pump integrated in the capsule according to the present invention can be actuated manually, but of course, it is preferably actuated automatically, by connecting the capsule to the actuator 24 which is present in the machine. The actuator is moved by an electric motor—not illustrated in the drawing—which provides vertical back and forth movements to the actuator 24.

In other terms, when the food and beverage container—for instance a coffee capsule—is functionally inserted into the food and beverage machine, two types of connections are performed. The first connection is a fluid connection which links the container to the fluid pipe system of the machine in such a way that fluid can circulate from the fluid source of the machine—for instance a water reservoir—towards and through the container compartment, wherein said fluid mixes as a mixing ingredient with the food or beverage precursor ingredient—for instance a coffee powder—which is contained into the container compartment.

The second type of connection that is performed between the container and the machine is a mechanical connection, which mechanically links the container to the pump actuator of the machine. The mechanical connection serves to actuate the pump means that are built-in with the container, such that fluid can be withdrawn from the fluid system of the machine, and be conducted through the container compartment as described above.

Figure 8:
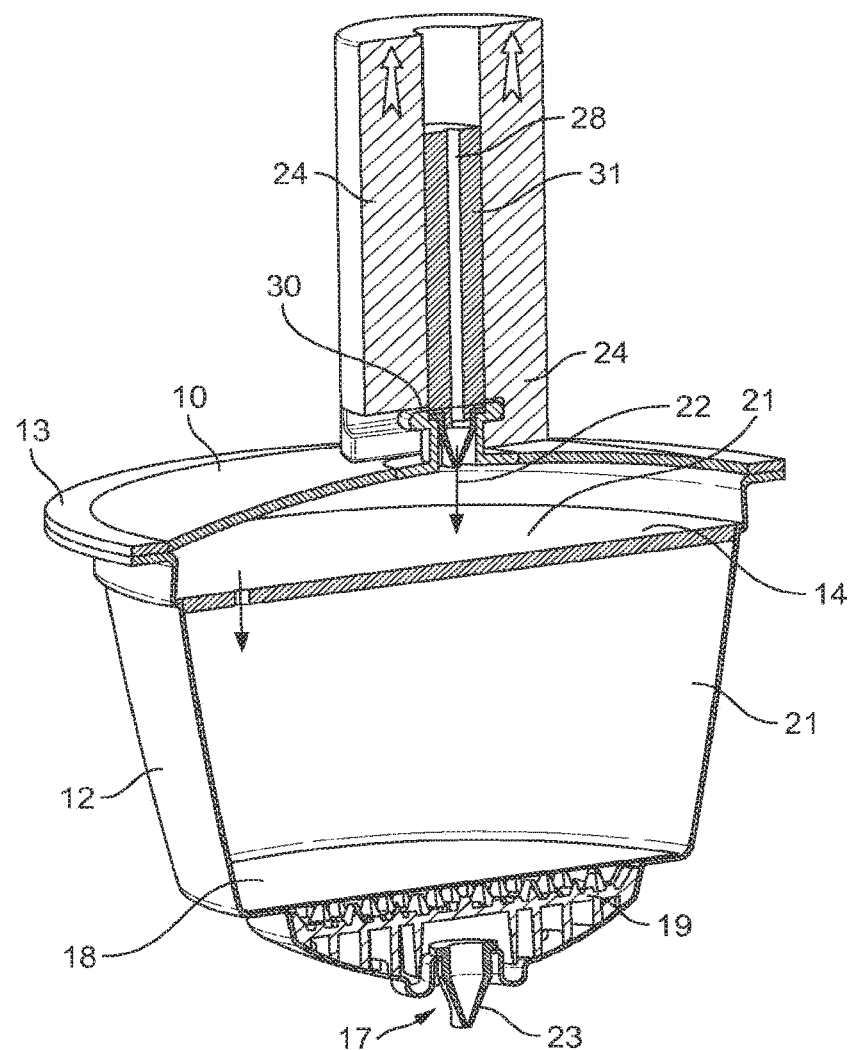
FIG. 8 is a perspective cut view of a container according to the invention, when the pump actuator of the food or beverage machine expands the pump wall of the container outwardly to increase the internal volume of said container.

The fluid connection portion is integrated with said mechanical connection means. As illustrated in FIGS. 2, 3, and 8, the mechanical catching protrusion 25 which is located in the centre of the upper stretchable injection wall 13 of the capsule, comprises a central channel 27 able to fluidly connect the pipe system 28 of the machine to the interior of the capsule, and in particular, to the closed volume 21 that forms the pump chamber of said capsule 11. The inlet check valve 22 is located within the central channel 27, as illustrated in FIGS. 2 and 3.

The capsule fluid connection portion 20 comprises a pierceable barrier membrane 30, which serves to seal the capsule 11 during storage, until it is actually used in the machine. The barrier membrane 30 is sealed on the top surface of the fluid connection portion 20 as illustrated for example in FIG. 3, 5 or 7. During storage, a complete barrier against moisture and oxygen is achieved between the interior and the exterior of the capsule, by the barrier properties of the capsule walls 12, the upper injection wall 13, the top barrier membrane 30, and the pierceable bottom membrane 18.

Figure 7:
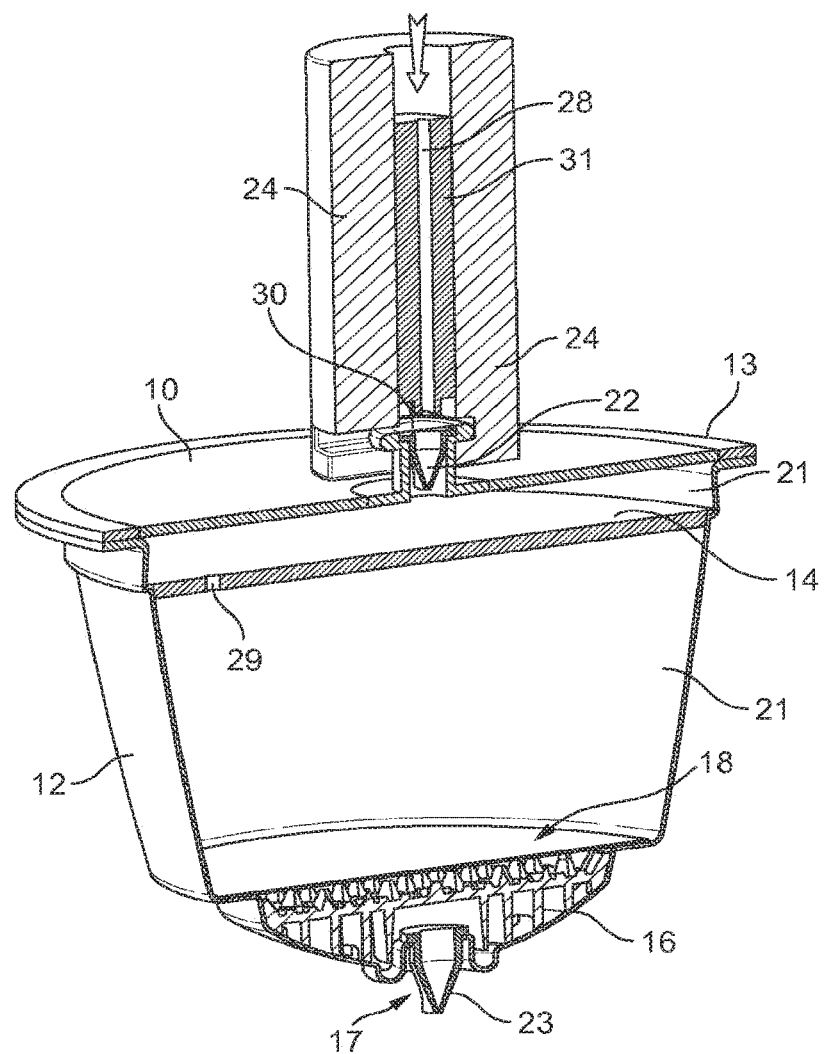
FIG. 7 is a perspective cut view similar to FIG. 6, showing the fluid connection established between said container and said machine.

Once the capsule 11 is inserted into the machine 1 and connected mechanically to the actuator of said machine, as illustrated in FIGS. 4, 5 and 6, the fluid connection is performed between the capsule and the machine by moving a fluid connection rod 31 of the machine which is in direct fluid communication with the rest of the machine fluid pipe system 28, as shown with an arrow in FIG. 7. As the downward movement of the fluid connection rod 31 progresses, the lower tip of said rod 31 pierces the stretchable portion of the capsule 10 through the seal top membrane 30 of the capsule, which creates the fluid communication between the capsule 11 and the fluid pipe system 28 of the machine 1, as illustrated in FIG. 8.

When the fluid connection between the capsule and the machine is made, the actuation of the capsule pump can start. The actuator 24 as well as the fluid connection rod 31 move together upwards as shown with double arrows in FIG. 8. This provokes the expansion of the capsule volume by stretching the stretchable portion of the capsule 10, since the capsule is mechanically and fluidly connected to the pump actuator 24 and fluid connection rod 31 of the machine. Both the actuator 24 and the rod 31 are moved by actuation means such as an electric motor, or another similar actuation means that is contained in the machine—not shown in the drawing.

Due to the stretching upward movement of the stretchable portion 10 of the capsule upper wall 13, the closed internal volume 21 of said capsule increases, which creates a depression within said closed volume 21, and consequently a suction effect from the fluid pipe system of the machine. Consequently, the inlet valve 22 opens and water from the fluid pipe system 28 of the machine enters the closed volume 21 of the capsule, as shown with single arrows in FIG. 8.

A certain quantity of water flows through the hole 29 of the rigid distributor wall 14, and starts mixing with the precursor ingredient—not shown in the drawing—contained in the main internal volume of the capsule compartment, so as to create the final product.

Figure 9:
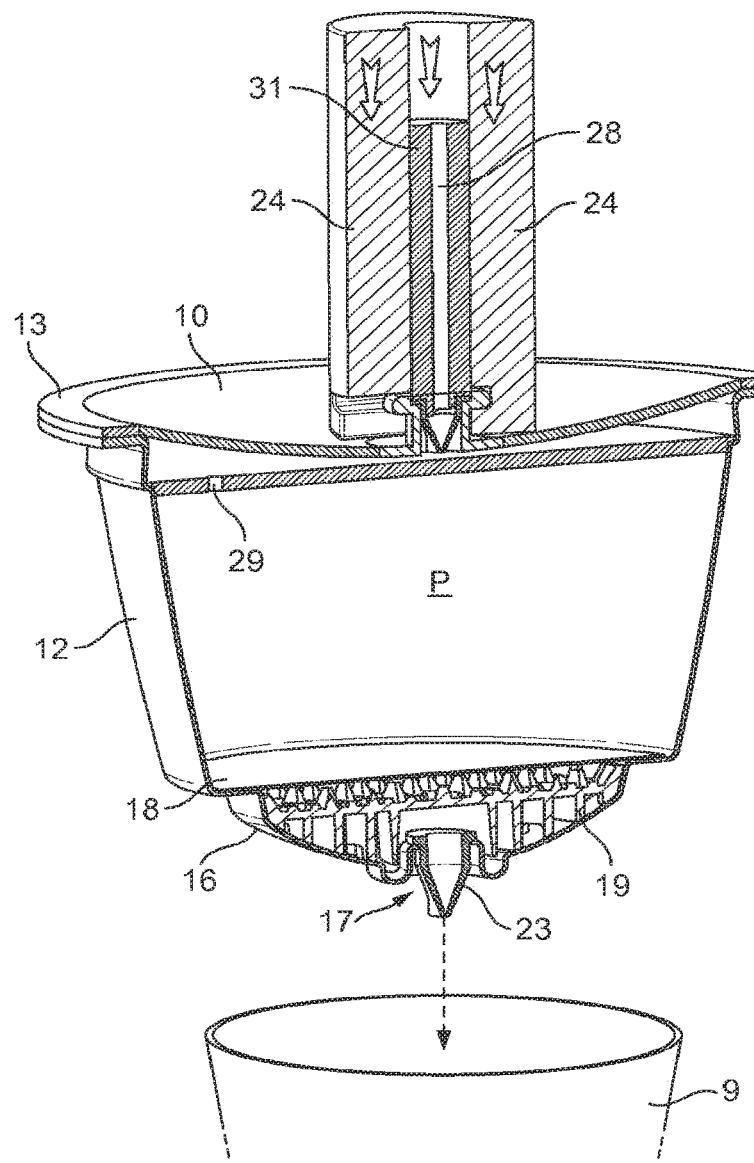
FIG. 9 is a perspective cut view of a container according to the invention, when the pump actuator of the food or beverage machine presses the pump wall of the container inwardly to reduce the internal volume of said container.

Then, the assembly constituted by the actuator 24 and the rod 31 move down as illustrated with double arrows in FIG. 9, which deforms the stretchable portion 10 of the upper injection wall 13 downwards and closes the inlet valve 22. This consequently reduces the closed volume 21 of the capsule and creates a pressure inside the capsule.

The assembly constituted by the actuator 24 and the rod 31 continue to alternatively move up and down as described before in reference to FIGS. 8 and 9, so that more and more water enters the capsule internal volume and compartment and mixes with the precursor ingredient. Internal water pressure P increases.

When fluid pressure P reaches a certain predetermined value, the aluminium membrane 18 flexes down and pierces onto the piercing surface of the piercing plate 19, which allows the product contained in the capsule compartment to flow outwardly through the dispensing opening 17 and outlet valve 23 into the cup 9, as shown with a dotted arrow in FIG. 9. When the predetermined appropriate volume of water has been injected into the capsule, the pump actuation back and forth movement of the rod 31 and actuator 24 stop. The used capsule can be withdrawn from the machine and be discarded.

Figure 10A:
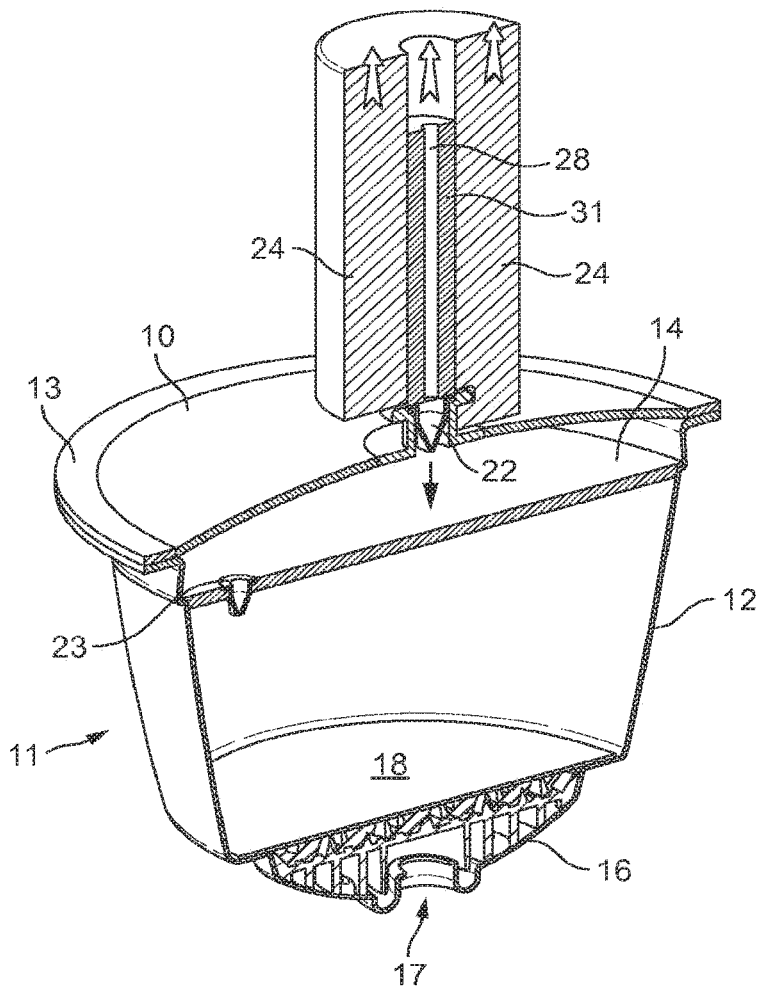
FIGS. 10A and 10B are perspective cut views of a container according to the first embodiment of the invention, in its expanded, respectively compressed pump state.
Figure 10B:
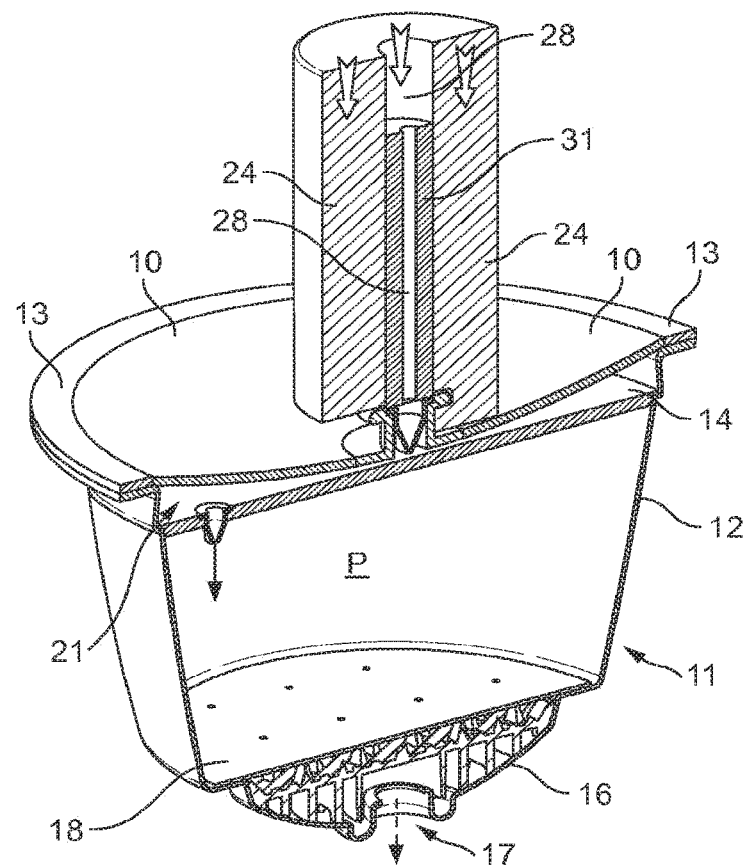

A similar functioning is illustrated in FIGS. 10A and 10B, where the capsule is designed according to the first embodiment of the invention mentioned above.

In this case, water is pumped within the closed volume 21 comprised between the inlet check valve 22 and the outlet check valve 23 when the capsule expands as shown in FIG. 10A, and then this pumped volume of water is ejected through the outlet check valve 23 into the main compartment of the capsule, as shown in FIG. 10B, where it mixes with the precursor ingredient. As more water enters the main internal compartment of the capsule from the closed pump volume 21, fluid pressure P increases until the bottom membrane 18 pierces onto the piercing plate 19 so that product contained in the capsule compartment can flow outwardly as shown with a dotted arrow in FIG. 10B.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention is claimed as follows:

1. A food or beverage preparation system comprising:
   (i) a container comprising walls defining at least one compartment adapted for containing at least one precursor ingredient, the walls comprising at least one fluid connection portion for fluidly coupling to a cooperating fluid connection portion of a food or beverage preparation machine having at least one source of a fluid mixing ingredient, whereby a food or beverage product is prepared within the at least one compartment by mixing the fluid mixing ingredient with the at least one precursor ingredient, the container further comprising at least one food or beverage delivery wall, the container comprises a built-in pump made of a closed but deformable volume of the container that is able to alternatively expand and retract, hence suitable for pumping the fluid mixing ingredient from the at least one source when the container is fluidly connected to the food or beverage preparation machine and for generating a fluid circulation within the at least one compartment, such that a food or beverage product is prepared and expelled through the at least one food or beverage delivery wall, the built-in pump constitutes an upper injection wall and a rigid distributor wall such that the rigid distributor wall is located between the upper injection wall and the least one compartment, wherein the rigid distributor wall comprises at least one through hole; and
   (ii) the food or beverage preparation machine, the food or beverage preparation machine comprising a mixing fluid reservoir, a fluid pipe system to which the at least one fluid connection portion of the container is connected by the cooperating fluid connection portion of the food or beverage preparation machine, a mechanical actuator, and a mechanical connection member for connecting mechanically the mechanical actuator to at least one stretchable or deformable portion of the upper injection wall of the container.

2. The system according to claim 1, wherein the at least one fluid connection portion of the container is adjacent to, or integrated with, the mechanical connection member of the capsule provided by the upper injection wall of the container.

3. The system according to claim 1, wherein the closed but deformable volume of the container comprises:
   (i) the least one stretchable or deformable portion of the upper injection wall of the container, the at least one stretchable or deformable portion is capable of being alternatively outwardly, then inwardly, elastically stretched or deformed by an outside thrust actuator of the food or beverage preparation machine, without tearing or breaking, such that the closed but deformable volume alternatively increases then decreases in pumping cycles;
   (ii) an admission opening that provides a fluid connection between the food or beverage preparation machine and the closed but deformable volume, from a source of water towards an interior of the closed but deformable volume; and
   (iii) an exit opening that allows a fluid connection from the interior towards an outside of the closed volume,
   wherein the admission opening comprises an inlet check valve, and/or the exit opening comprises an outlet check valve.

* * * * *